United States Patent
Yunis et al.

(10) Patent No.: US 7,516,333 B2
(45) Date of Patent: *Apr. 7, 2009

(54) HYBRID JAVA-C NETWORK APPLIANCE

(76) Inventors: Mamoon Yunis, 25 Thurston Rd., Newton, MA (US) 02464; Rizwan Mallal, 3908 Stearns Hills Rd., Waltham, MA (US) 02451; Thomas C. Stickle, 259 Washington Ave., St. James, NY (US) 11780

( * ) Notice: Subject to any disclaimer, the term of this patent is extended or adjusted under 35 U.S.C. 154(b) by 619 days.

This patent is subject to a terminal disclaimer.

(21) Appl. No.: 10/909,848

(22) Filed: Aug. 2, 2004

(65) Prior Publication Data

US 2005/0132210 A1 Jun. 16, 2005

Related U.S. Application Data

(60) Provisional application No. 60/492,174, filed on Aug. 1, 2003.

(51) Int. Cl.
*H04L 9/00* (2006.01)
*G06F 17/00* (2006.01)
*H04K 1/00* (2006.01)
*H04N 7/167* (2006.01)

(52) U.S. Cl. .................. 713/192; 726/1; 726/12; 713/153; 713/160; 380/239

(58) Field of Classification Search .............. 726/1, 726/12; 713/153, 160, 192; 380/239
See application file for complete search history.

(56) References Cited

U.S. PATENT DOCUMENTS

| | | | | |
|---|---|---|---|---|
| 5,875,335 | A * | 2/1999 | Beard ........................ | 717/139 |
| 6,167,565 | A * | 12/2000 | Kanamori ................. | 717/146 |
| 6,170,057 | B1 * | 1/2001 | Inoue et al. ............... | 713/153 |
| 6,442,687 | B1 * | 8/2002 | Savage ...................... | 713/156 |
| 6,549,934 | B1 * | 4/2003 | Peterson et al. ........... | 709/203 |
| 6,983,463 | B1 * | 1/2006 | Hunt ......................... | 719/316 |
| 2003/0014628 | A1 * | 1/2003 | Freed et al. ............... | 713/155 |
| 2004/0158624 | A1 * | 8/2004 | Bodin et al. ............... | 709/222 |

OTHER PUBLICATIONS

Brown, Ian et al. "A proxy approach to e-mail security", Software-Practice & Experience, vol. 29, Issue 12, pp. 1049-1060, Oct. 1999.*
Dowling, Andy et al. "A proxy-based security architecture for Internet applications in an extranet environment", Journal of Systems and Software, vol. 58, Issue 2, pp. 107-118, Sep. 2001.*
Hwang, David, et al. "Design flow for HW / SW acceleration transparency in the thumbpod secure embedded system", Proceedings of the 40th conference on Design automation, pp. 60-65, Jun. 2003.*

(Continued)

*Primary Examiner*—Kambiz Zand
*Assistant Examiner*—Michael J Simitoski
(74) *Attorney, Agent, or Firm*—Morriss O'Bryant Compagni

(57) ABSTRACT

A network appliance that runs both C and Java integrated software to provide a flexible architecture for rapid prototyping of XML security functionality, including SSL acceleration, XML encryption, XML decryption, XML signature, and XML verification, while the network appliance continues to provide high-speed performance.

12 Claims, 3 Drawing Sheets

OTHER PUBLICATIONS

Jaworski, Jamie et al. Java Security Handbook, 2000 Sams Publishing, pp. 25-46, 229-241.*

Mraz, Ron. "Secure Blue: An Architecture for a Scalable, Reliable High Volume SSL Internet Server", Dec. 2001.*

Schaumont, Patrick et al. "Domain specific codesign for embedded security", Computer, vol. 36, Issue: 4, pp. 68-74, Apr. 2003.*

Sun. "JavaTM Cryptography Extension (JCE) Reference Guide", retrieved Feb. 2002, <http://web.archive.org/web/20020202235910/java.sun.com/j2se/1.4/docs/guide/security/jce/JCERefGuide.html>.*

Chan, Alvin T.S. et al. "A Web-Enabled Framework for Smart Card Application in Health Services", Sep. 2001, ACM.*

* cited by examiner

HYBRID JAVA-C NETWORK APPLIANCE

CROSS-REFERENCE TO RELATED APPLICATIONS

This application claims priority to and incorporates by reference provisional patent application Ser. No. 60/492,174, filed Aug. 1, 2003.

BACKGROUND OF THE INVENTION

1. Field of the Invention

This invention relates generally to a hardware network appliance running C and Java® software and providing XML security functionality, wherein the C and Java® code are both integrated in the appliance to provide SSL acceleration, XML encryption, XML decryption, XML signature, and XML verification, and wherein the network appliance can be deployed in different network topologies using the C and Java® integrated code to thereby obtain improved speed and flexibility.

2. Description of Related Art

The state of the art in XML security products is characterized by a network appliance that is designed to perform desired security functions. For example, SSL acceleration, XML encryption, XML decryption, XML signature, and XML verification can all be performed by these network appliances on network traffic that is intercepted.

Network traffic is intercepted by placing the network appliance in an in-line mode to intercept traffic that is targeted towards application or integration servers, or functioning as a proxy server in order to intercept all server requests.

Generally, a network appliance will run C code in its systems in order to provide the desired network functions. However, the C programming language can be cumbersome to use because it is not optimized for addressing network issues. Coding can also be a time-consuming process. Thus, it becomes more difficult to provide updated software for the network appliance that will enable the appliance to keep pace with rapid advancements in network functions.

Accordingly, what is needed is a network appliance that has a flexible architecture that will allow such things as cutting edge XML security features to be rapidly prototyped and deployed in the network appliance.

BRIEF SUMMARY OF THE INVENTION

It is an object of the present invention to provide a network appliance that can be rapidly updated with cutting edge security functionality.

It is another object to provide a network appliance having a flexible architecture that enables rapid prototyping.

It is another object to provide a network appliance that can be programmed using a language that is better suited for rapid prototyping and network functions.

It is another object to provide a network appliance that can be deployed in different network topologies.

It is another object to provide a network appliance that enables rapid prototyping without sacrificing high-speed performance.

In a preferred embodiment, the present invention is a network appliance that runs both C and Java® integrated software to provide a flexible architecture for rapid prototyping of XML security functionality, including SSL acceleration, XML encryption, XML decryption, XML signature, and XML to provide high-speed performance.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Figure 1:
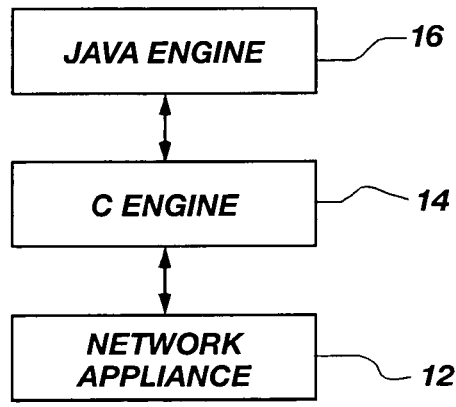
FIG. 1 is a block diagram that illustrates the components of the system as made in accordance with the principles of the present invention.
Figure 2:
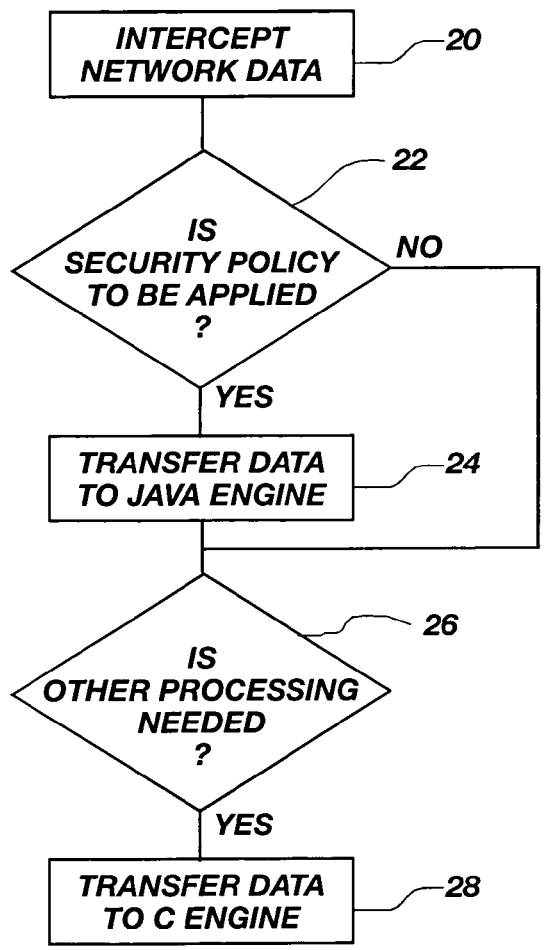
FIG. 2 is a flowchart of one embodiment of the present invention.

The presently preferred embodiment of the invention is a system whereby all security functions can be accelerated through the careful use of security policies that enable the present invention to accelerate some security functions of a network. For example, consider the general flow of network data through the hardware shown in FIG. 1 and shown as a flowchart in FIG. 2. FIG. 1 shows a network appliance 12. This network appliance 12 can be configured in an in-line mode wherein network traffic must pass through it to get to another side, or in a proxy mode. The goal of the present invention is to increase throughput of network traffic through the network appliance, especially when the network traffic must have a security process performed before the network traffic is permitted to continue on to its intended destination.

Accordingly in step 1 (20), network traffic will be intercepted by the network appliance 12. As a TCP/IP packet enters one of the Ethernet ports of the network appliance 12, a network driver of the present invention performs an analysis. The purpose of the analysis is to match the IP packet to a particular server policy in step 2 (22).

Further explanation is useful at this step. The TCP/IP packet is being transferred using TCP/IP protocols. TCP enables two hosts to establish a connection and exchange streams of data. TCP guarantees delivery of data and also guarantees that packets will be delivered in the same order in which they were sent. In contrast, IP specifies the format of packets. IP is thus combined with the higher level protocol TCP. IP enables a packet to have an address, but there is no direct link between the sender and the recipient. Thus, the present invention is simply analyzing the packet itself in step 2 (22) to determine what security policy may need to be applied.

An example of a security policy is to direct all security functions to a Java® engine 16 for processing in step 3 (24). Thus, if the IP packet is encrypted, the security function to be performed is decryption so that the intended recipient of the message can read the message. This security function must be considered only to be an example, and not limiting in any way. Other security functions that may be performed may be considered to include, but not be limited to, encryption, decryption, verification, and signing functions.

Accordingly, if the IP packet is analyzed and determined to match a policy that requires action on the part of the Java® engine 16, the IP packet is transferred from the network appliance 12 to the Java® engine. The Java® engine 16 processes a data portion of the IP packet. The next step 4 (26) is to determine if more processing is required that is not performed by the Java® engine 16. If more processing is required, the next step 5 (28) is to send the data to a C engine 14 for further processing. Further processing may include acceleration of security functions as explained and incorporated by reference from co-pending patent applications entitled JAVA CRYPTOGRAPHIC ENGINE TO CRTYPTO ACCELERATION INTEGRATION, and ARBITRARY JAVA LOGIC DEPLOYED TRANSPARENTLY IN A NETWORK, both filed on Aug. 1, 2003. After further processing of the data, the C engine 12 sends the data back to the Java® engine 16. Finally, the Java® engine 16 sends the data in the form of an IP packet back to a network port.

It is important to recognize that the processes begin performed by the C engine 12 may be able to be implemented in hardware. For example, consider the process of cryptographic acceleration, which may include encryption, decryption, verification and signing processes. Cryptographic acceleration can be performed by the C engine 12, but it can also be offloaded to dedicated hardware.

Figure 3:
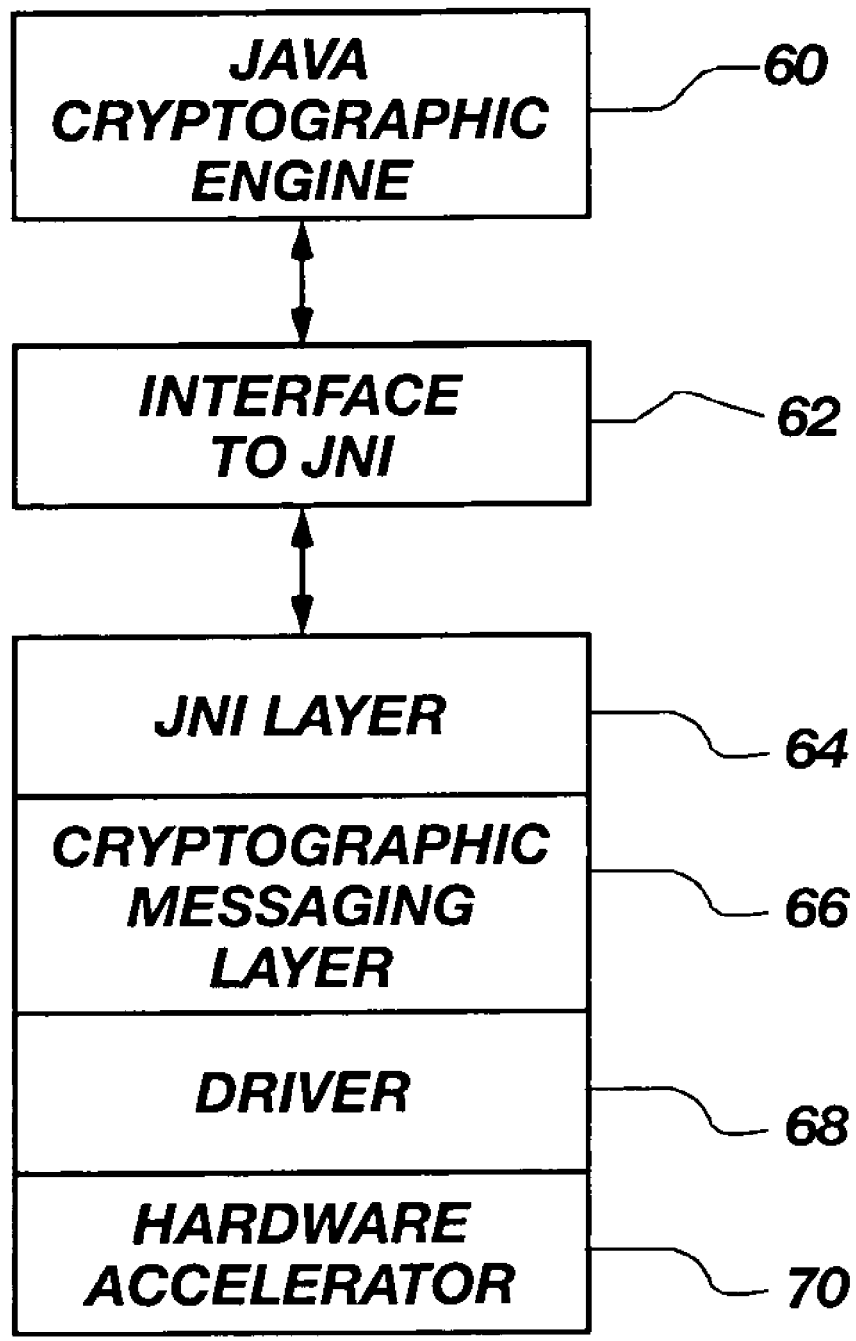
FIG. 3 is a block diagram of functional layers of operations that are arranged in accordance with other the principles of the present invention.
Figure 4:
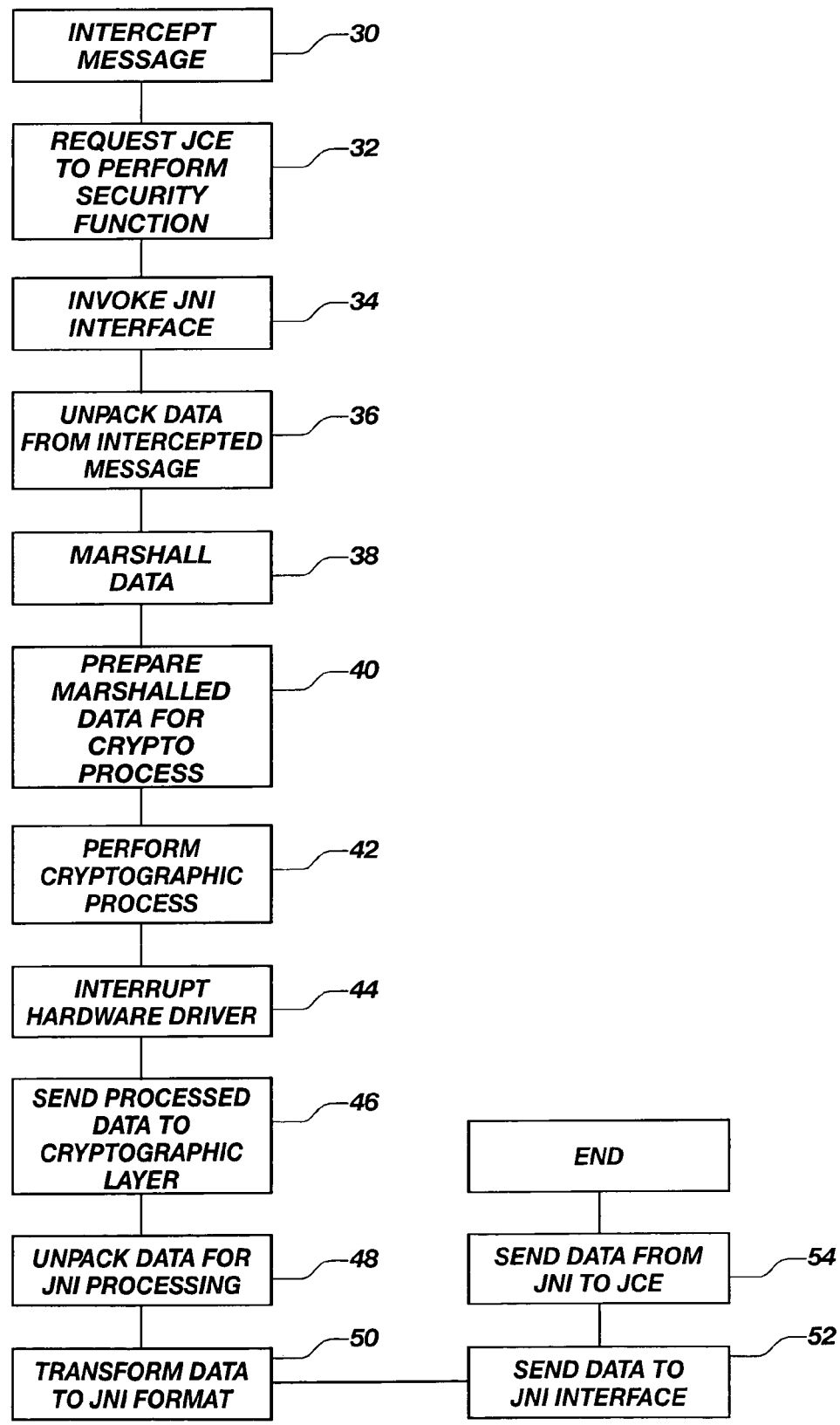
FIG. 4 is a flowchart of the steps that can be performed in another embodiment of the present invention.

In this example of the present invention as shown in FIGS. 3 and 4, the security function that is to be performed is a public key operation as understood by those skilled in the art. Specifically, a public key may be known by everyone, and a private key is known only to the recipient of the message. The public key will be assumed to have been used to encrypt a message that has been intercepted in step 1 (30) by the network appliance. It is assumed that it is known that the message contains a message that requires a cryptographic process to be performed.

After interception, a request enters the JCE layer 12 for a public key operation to be performed on data using, for example, the RSA cryptographic algorithm in step 2 (32). The next step 3 (34) is for Java® Native Interface (JNI) hooks to be invoked through the Interface to JNI 64. In the present invention, the JNI hooks are only inserted in particular sections of the JCE 60 when public key operations are to be offloaded. The JNI hooks provide an interface to a C interface library which is shown as the JNI layer 64.

The next step 4 (36) is for the JNI layer 64 to take the requests for public key operations from the layers above and unpack the data from the message so that the data can be manipulated by the C language.

After being unpacked, the data is marshaled by the Cryptographic Messaging layer 66 in step 5 (38). Data marshalling is required when passing the output parameters of a program written in one language as input to a program written in another language. In this case, the purpose of data marshalling is to gather data and transform it into a standard format. In order for an object to be moved around a network, it must be converted into a data stream that corresponds with the packet structure of the network transfer protocol.

After marshalling, the data is passed on to the Hardware Driver 68. The purpose of the Hardware Driver 68 is to prepare Hardware Accelerator 70 to perform the desired operation in step 6 (40). In this case, the Hardware Accelerator 70 is being prepared to perform decryption of the intercepted message.

Once the RSA decryption operation is performed in step 7 (42), the Hardware Driver 68 is interrupted by the Hardware Accelerator 70 in step 8 (44). The Hardware Driver 68 passes the decrypted data back to the Cryptographic Messaging Layer 66 in step 9 (46). The Cryptographic Messaging Layer 66 unpacks the decrypted data in raw C format in step 10 (48) for the JNI Layer 64 to transform to JNI format in step 11 (50) which the upper Java® layers will understand. Once the JNI Interface 62 hooked to the JCE 60 receives the result in JNI format in step 12 (52), the JNI Interface 62 unpacks the decrypted data and sends the results to the JCE 60 in step 13 (54).

It should be understood that the sequence above is followed for any security functions that can be offloaded to a hardware accelerator, and is not limited to the example of RSA decryption described above.

It is envisioned that the Java® and C proxy engines will be ported to a software platform on a desktop PC or a notebook PC running, for example, Windows 2000 or Windows XP. However, this should not be considered a limiting factor, and the present invention can be ported to other operating systems and other hardware platforms as well.

The advantages of the present invention over the prior art are substantial. The present invention is versatile because of its platform independence that is enabled by the use of the Java® language. The offloading is transparent to operation of the network appliance. Use of the Java® language inherently means that the prototyping of changes and improvements is rapid because of the ease of use of the Java® language. Performance of the offloaded security functions is substantially increased because of hardware that is dedicated to the desired security functions, instead of using a general purpose CPU. Furthermore, high speed performance is maintained because of the use of the Java® language.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for applying security policies to data in a network, said method comprising the steps of:
   intercepting data being transferred across the network;
   determining that a security function to be performed can be offloaded for acceleration;
   utilizing a JAVA® Cryptographic Engine (JCE) to transparently offload the data;
   performing the security function in hardware, said hardware performing the steps of:
      entering a request in a JCE layer for a cryptographic function to be performed;
      invoking JAVA® Native Interface (JNI) hooks in a JNI layer to function as an interface to an operating system specific C programming language interface library;
      unpacking data from the intercepted data so that the unpacked data can be manipulated in the operating system specific programming language; and
      marshalling the unpacked data in a cryptographic messaging layer so that the unpacked data can be transformed to a standard format.

2. The method as defined in claim 1 wherein the method further comprises the step of marshalling the data so that the data can be transferred across a network having a specific network packet protocol.

3. The method as defined in claim 2 wherein the method further comprises the step of transferring the data to a hardware driver.

4. The method as defined in claim 3 wherein the method further comprises the step of using the hardware driver to prepare a hardware accelerator for receiving data to be cryptographically processed.

5. The method as defined in claim 4 wherein the method further comprises the step of transferring the data from the hardware driver to the hardware accelerator for cryptographic processing.

6. The method as defined in claim 5 wherein the method further comprises the step of selecting the type of cryptographic processing to be performed by the hardware accelerator from the group of cryptographic processes comprised of encrypting, decrypting, verification and signing.

7. The method as defined in claim 6 wherein the method further comprises the step of interrupting the hardware driver when the hardware accelerator has completed its cryptographic processing of the data so that the data can be transferred to a next destination.

8. The method as defined in claim 7 wherein the method further comprises the step of transferring the data from the hardware driver to the cryptographic messaging layer.

9. The method as defined in claim 8 wherein the method further comprises the step of unpacking the data.

10. The method as defined in claim 9 wherein the method further comprises the step of transferring the data from the cryptographic messaging layer to the JNI layer.

11. The method as defined in claim 10 wherein the method further comprises the step of transforming the data in the JNI layer.

12. The method as defined in claim 11 wherein the method further comprises the step of transferring the data from the JNI layer to the JCE layer through the JNI interface.

* * * * *